United States Patent
Dattaray et al.

(10) Patent No.: US 10,740,337 B2
(45) Date of Patent: Aug. 11, 2020

(54) AUTOMATICALLY GENERATING LINKS FOR DATA PACKETS IN AN ELECTRONIC SYSTEM

(71) Applicant: Mitchell International, Inc., San Diego, CA (US)

(72) Inventors: Basab Dattaray, San Diego, CA (US); Bryan Durant, San Diego, CA (US)

(73) Assignee: MITCHELL INTERNATIONAL, INC., San Diego, CA (US)

( * ) Notice: Subject to any disclaimer, the term of this patent is extended or adjusted under 35 U.S.C. 154(b) by 187 days.

(21) Appl. No.: 15/616,536

(22) Filed: Jun. 7, 2017

(65) Prior Publication Data
US 2018/0359152 A1    Dec. 13, 2018

Related U.S. Application Data

(63) Continuation-in-part of application No. 14/070,160, filed on Nov. 1, 2013, now abandoned.

(51) Int. Cl.
*G06F 16/2457* (2019.01)
*G06F 16/2455* (2019.01)
*H04L 12/26* (2006.01)

(52) U.S. Cl.
CPC .. *G06F 16/24578* (2019.01); *G06F 16/24568* (2019.01); *H04L 43/0805* (2013.01)

(58) Field of Classification Search
CPC ..... H04L 41/12; H04L 41/14; H04L 43/0805; H04L 67/18; G06F 17/3053; G06F 16/24568; G06F 16/24578
See application file for complete search history.

(56) References Cited

U.S. PATENT DOCUMENTS 7,210,119 B2 * 4/2007 Pothos ............... G06Q 10/1097
717/102
8,522,240 B1    8/2013 Merwarth et al.
(Continued)

OTHER PUBLICATIONS

Final Office Action for U.S. Appl. No. 14/070,160, dated Dec. 7, 2016, 23 pages.
(Continued)

*Primary Examiner* — Brian P Cox
(74) *Attorney, Agent, or Firm* — Kilpatrick Townsend & Stockton LLP

(57) ABSTRACT

The disclosed systems and methods generate links for candidate execution load/execution component pairings, each candidate pairing identifying one of the data packets corresponding with the execution loads and one of the data packets corresponding with the execution components. Ranks are generated for the candidate pairings, and candidate pairings are selected for potential linkage based on the ranks. If the data packet corresponding with an execution load of a candidate pairing is linkable to the data packet corresponding with an execution component of the candidate pairing, the data packet corresponding with the execution load is linked to the data packet corresponding with the execution component. If the data packet corresponding with the execution load of the candidate pairing is not linkable to the data packet corresponding with the execution component of the pairing, a next candidate pairing is selected.

24 Claims, 5 Drawing Sheets

(56) References Cited

U.S. PATENT DOCUMENTS

| | | | |
|---|---|---|---|
| 8,543,438 B1* | 9/2013 | Fleiss | G06Q 10/0631 705/7.13 |
| 2002/0029161 A1* | 3/2002 | Brodersen | G06Q 10/06 705/7.14 |
| 2008/0243575 A1 | 10/2008 | Weinberger et al. | |
| 2009/0113442 A1 | 4/2009 | Deidda et al. | |
| 2014/0122143 A1* | 5/2014 | Fletcher | G06Q 10/0631 705/7.14 |
| 2014/0380321 A1* | 12/2014 | Rangarajan | G06F 9/4893 718/102 |
| 2015/0127399 A1* | 5/2015 | Dattaray | G06Q 10/06311 705/7.14 |

OTHER PUBLICATIONS

Non-Final Office Action for U.S. Appl. No. 14/070,160, dated Jun. 10, 2016, 17 pages.

* cited by examiner

AUTOMATICALLY GENERATING LINKS FOR DATA PACKETS IN AN ELECTRONIC SYSTEM

CROSS-REFERENCE TO RELATED APPLICATIONS

This application is a continuation-in-part of U.S. patent application Ser. No. 14/070,160, filed on Nov. 1, 2013 and entitled "SYSTEM AND METHOD OF AUTOMATICALLY ALLOCATING TASKS," the contents of which are incorporated herein by reference in its entirety.

BACKGROUND

The present invention generally relates to systems which generate links between sets of data packets corresponding with execution loads and sets of data packets corresponding with execution components, and more particularly to systems which generate links between data packets corresponding with execution loads and data packets corresponding with execution components, where each of the data packets corresponding with execution loads and each of the data packets corresponding with execution components are associated with a physical location.

Determining which data packets corresponding with execution loads should be linked with which data packets corresponding with execution components is computationally complex and can require large amounts of computing resources to perform. Because the calculation is NP (non-deterministic polynomial)-complete, an optimum solution may be found only by considering all possible solutions, and comparing the solutions based on a metric or rule whose outcome is to be optimized.

The computational load for finding an optimum solution increases exponentially with the number of execution loads and the number of execution components. Because all possible solutions are calculated, linking the data packets corresponding with the execution loads with the data packets corresponding with the execution components is impractical for situations having more than a few execution loads and execution components.

BRIEF SUMMARY

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a method of generating links between a plurality of data packets corresponding with execution loads to a plurality of data packets corresponding with execution components, the method including: generating a plurality of candidate pairings, each candidate pairing identifying one of the data packets corresponding with the execution loads and one of the data packets corresponding with one of the execution components. The method of generating links also includes generating a rank for each of the generated candidate pairings. The method of generating links also includes selecting a first candidate pairing from the generated plurality of candidate pairings, where the first candidate pairing is selected based at least in part on the rank of the first candidate pairing, where the first candidate pairing identifies a first data packet corresponding with a first execution load and a second data packet corresponding with a first execution component. The method of generating links also includes determining whether the first data packet is linkable to the second data packet. The method of generating links also includes in response to the first data packet being linkable to the second data packet, generating a link between the first data packet the second data packet. The method of generating links also includes communicating the generated link to the first execution component. The method of generating links also includes in response to the first data packet not being linkable to the second data packet, selecting a second candidate pairing from the plurality of candidate pairings. Other embodiments of this aspect include corresponding computer systems, apparatus, and computer programs recorded on one or more computer storage devices, each configured to perform the actions of the methods.

Implementations may include one or more of the following features. The method where generating the candidate pairings includes determining which data packets corresponding with execution components are eligible for linkage to each of the data packets corresponding with the execution loads, and generating candidate pairings which each include one of the data packets corresponding with execution loads and one of the data packets corresponding with execution components which are determined to be eligible. The method where determining which data packets corresponding with execution components are eligible for linkage to each of the data packets corresponding with the execution loads includes performing an analysis of execution load attributes and execution component attributes. The method where the rank of each particular candidate pairing indicates a desirability of linking the execution load of the particular candidate pairing to the execution component of the particular candidate pairing relative to linking the execution load of the particular candidate pairing to one or more other execution components. The method where the rank of each particular candidate pairing indicates a proximity of the physical location of the execution load of the particular candidate pairing to the physical location of the execution component of the particular candidate pairing relative to a proximity of the physical location of the execution load of the particular candidate pairing to the physical location of one or more other execution components. The method further including selecting a group of candidate pairings having the same rank, where the first candidate pairing is selected from the group of candidate pairings. The method where determining whether the first data packet is linkable to the second data packet includes determining whether an availability of the execution component of the second data packet accommodates the execution load of the first data packet. The method where determining whether the availability of the execution component of the second data packet accommodates the execution load of the first data packet includes determining an expected execution duration for the execution load of the first data packet and determining a travel parameter for the execution component of the second data packet. The computer system where generating the candidate pairings includes determining which data packets corresponding with execution components are eligible for linkage to each of the data packets corresponding with the execution loads, and generating candidate pairings which each include one of the data packets corresponding with execution loads and one of the data packets corresponding with execution components which are determined to be eligible. The system where determining which data packets corresponding with execution components are eligible for linkage to each of the data packets corresponding with the execution loads includes performing an analysis of execution load attributes and execution component attributes. The system where the rank of each particular candidate pairing indicates a desirability of linking the execution load of the particular candidate pairing to the execution component of the particular candidate pairing relative to linking the execution load of the particular candidate pairing to one or more other execution components. The system where the rank of each particular candidate pairing indicates a proximity of the physical location of the execution load of the particular candidate pairing to the physical location of the execution component of the particular candidate pairing relative to a proximity of the physical location of the execution load of the particular candidate pairing to the physical location of one or more other execution components. The system where the method further includes selecting a group of candidate pairings having the same rank, where the first candidate pairing is selected from the group of candidate pairings. The system where determining whether the first data packet is linkable to the second data packet includes determining whether an availability of the execution component of the second data packet accommodates the execution load of the first data packet. The system where determining whether the availability of the execution component of the second data packet accommodates the execution load of the first data packet includes determining an expected execution duration for the execution load of the first data packet and determining a travel parameter for the execution component of the second data packet. The computer readable medium where generating the candidate pairings includes determining which data packets corresponding with execution components are eligible for linkage to each of the data packets corresponding with the execution loads, and generating candidate pairings which each include one of the data packets corresponding with execution loads and one of the data packets corresponding with execution components which are determined to be eligible. The computer readable medium where determining which data packets corresponding with execution components are eligible for linkage to each of the data packets corresponding with the execution loads includes performing an analysis of execution load attributes and execution component attributes. The computer readable medium where the rank of each particular candidate pairing indicates a desirability of linking the execution load of the particular candidate pairing to the execution component of the particular candidate pairing relative to linking the execution load of the particular candidate pairing to one or more other execution components. The computer readable medium where the rank of each particular candidate pairing indicates a proximity of the physical location of the execution load of the particular candidate pairing to the physical location of the execution component of the particular candidate pairing relative to a proximity of the physical location of the execution load of the particular candidate pairing to the physical location of one or more other execution components. The computer readable medium where the method further includes selecting a group of candidate pairings having the same rank, where the first candidate pairing is selected from the group of candidate pairings. The computer readable medium where determining whether the first data packet is linkable to the second data packet includes determining whether an availability of the execution component of the second data packet accommodates the execution load of the first data packet. The computer readable medium where determining whether the availability of the execution component of the second data packet accommodates the execution load of the first data packet includes determining an expected execution duration for the execution load of the first data packet and determining a travel parameter for the execution component of the second data packet. Implementations of the described techniques may include hardware, a method or process, or computer software on a computer-accessible medium.

One general aspect includes a computer system, including: a processor; and a memory, including instructions, which when executed by the process cause the computer system to perform a method of generating links between a plurality of data packets corresponding with execution loads to a plurality of data packets corresponding with execution components, the method including. The computer system also includes generating a plurality of candidate pairings, each candidate pairing identifying one of the data packets corresponding with the execution loads and one of the data packets corresponding with one of the execution components. The computer system also includes generating a rank for each of the generated candidate pairings. The computer system also includes selecting a first candidate pairing from the generated plurality of candidate pairings, where the first candidate pairing is selected based at least in part on the rank of the first candidate pairing, where the first candidate pairing identifies a first data packet corresponding with a first execution load and a second data packet corresponding with a first execution component. The computer system also includes determining whether the first data packet is linkable to the second data packet. The computer system also includes in response to the first data packet being linkable to the second data packet, generating a link between the first data packet the second data packet. The computer system also includes in response to the first data packet not being linkable to the second data packet, selecting a second candidate pairing from the plurality of candidate pairings. Other embodiments of this aspect include corresponding computer systems, apparatus, and computer programs recorded on one or more computer storage devices, each configured to perform the actions of the methods.

Implementations may include one or more of the following features. The computer system where generating the candidate pairings includes determining which data packets corresponding with execution components are eligible for linkage to each of the data packets corresponding with the execution loads, and generating candidate pairings which each include one of the data packets corresponding with execution loads and one of the data packets corresponding with execution components which are determined to be eligible. The system where determining which data packets corresponding with execution components are eligible for linkage to each of the data packets corresponding with the execution loads includes performing an analysis of execution load attributes and execution component attributes. The system where the rank of each particular candidate pairing indicates a desirability of linking the execution load of the particular candidate pairing to the execution component of the particular candidate pairing relative to linking the execution load of the particular candidate pairing to one or more other execution components. The system where the rank of each particular candidate pairing indicates a proximity of the physical location of the execution load of the particular candidate pairing to the physical location of the execution component of the particular candidate pairing relative to a proximity of the physical location of the execution load of the particular candidate pairing to the physical location of one or more other execution components. The system where the method further includes selecting a group of candidate pairings having the same rank, where the first candidate pairing is selected from the group of candidate pairings. The system where determining whether the first data packet is linkable to the second data packet includes determining whether an availability of the execution component of the second data packet accommodates the execution load of the first data packet. The system where determining whether the availability of the execution component of the second data packet accommodates the execution load of the first data packet includes determining an expected execution duration for the execution load of the first data packet and determining a travel parameter for the execution component of the second data packet. The computer readable medium where generating the candidate pairings includes determining which data packets corresponding with execution components are eligible for linkage to each of the data packets corresponding with the execution loads, and generating candidate pairings which each include one of the data packets corresponding with execution loads and one of the data packets corresponding with execution components which are determined to be eligible. The computer readable medium where determining which data packets corresponding with execution components are eligible for linkage to each of the data packets corresponding with the execution loads includes performing an analysis of execution load attributes and execution component attributes. The computer readable medium where the rank of each particular candidate pairing indicates a desirability of linking the execution load of the particular candidate pairing to the execution component of the particular candidate pairing relative to linking the execution load of the particular candidate pairing to one or more other execution components. The computer readable medium where the rank of each particular candidate pairing indicates a proximity of the physical location of the execution load of the particular candidate pairing to the physical location of the execution component of the particular candidate pairing relative to a proximity of the physical location of the execution load of the particular candidate pairing to the physical location of one or more other execution components. The computer readable medium where the method further includes selecting a group of candidate pairings having the same rank, where the first candidate pairing is selected from the group of candidate pairings. The computer readable medium where determining whether the first data packet is linkable to the second data packet includes determining whether an availability of the execution component of the second data packet accommodates the execution load of the first data packet. The computer readable medium where determining whether the availability of the execution component of the second data packet accommodates the execution load of the first data packet includes determining an expected execution duration for the execution load of the first data packet and determining a travel parameter for the execution component of the second data packet. Implementations of the described techniques may include hardware, a method or process, or computer software on a computer-accessible medium.

One general aspect includes a computer readable medium including non-transient instructions, which, when executed by a computer, cause the computer to perform a method of generating links between a plurality of data packets corresponding with execution loads to a plurality of data packets corresponding with execution components, the method including: generating a plurality of candidate pairings, each candidate pairing identifying one of the data packets corresponding with the execution loads and one of the data packets corresponding with one of the execution components; generating a rank for each of the generated candidate pairings; selecting a first candidate pairing from the generated plurality of candidate pairings, where the first candidate pairing is selected based at least in part on the rank of the first candidate pairing, where the first candidate pairing identifies a first data packet corresponding with a first execution load and a second data packet corresponding with a first execution component; determining whether the first data packet is linkable to the second data packet; in response to the first data packet being linkable to the second data packet, generating a link between the first data packet the second data packet; and in response to the first data packet not being linkable to the second data packet, selecting a second candidate pairing from the plurality of candidate pairings. Other embodiments of this aspect include corresponding computer systems, apparatus, and computer programs recorded on one or more computer storage devices, each configured to perform the actions of the methods.

Implementations may include one or more of the following features. The computer readable medium where generating the candidate pairings includes determining which data packets corresponding with execution components are eligible for linkage to each of the data packets corresponding with the execution loads, and generating candidate pairings which each include one of the data packets corresponding with execution loads and one of the data packets corresponding with execution components which are determined to be eligible. The computer readable medium where determining which data packets corresponding with execution components are eligible for linkage to each of the data packets corresponding with the execution loads includes performing an analysis of execution load attributes and execution component attributes. The computer readable medium where the rank of each particular candidate pairing indicates a desirability of linking the execution load of the particular candidate pairing to the execution component of the particular candidate pairing relative to linking the execution load of the particular candidate pairing to one or more other execution components. The computer readable medium where the rank of each particular candidate pairing indicates a proximity of the physical location of the execution load of the particular candidate pairing to the physical location of the execution component of the particular candidate pairing relative to a proximity of the physical location of the execution load of the particular candidate pairing to the physical location of one or more other execution components. The computer readable medium where the method further includes selecting a group of candidate pairings having the same rank, where the first candidate pairing is selected from the group of candidate pairings. The computer readable medium where determining whether the first data packet is linkable to the second data packet includes determining whether an availability of the execution component of the second data packet accommodates the execution load of the first data packet. The computer readable medium where determining whether the availability of the execution component of the second data packet accommodates the execution load of the first data packet includes determining an expected execution duration for the execution load of the first data packet and determining a travel parameter for the execution component of the second data packet. Implementations of the described techniques may include hardware, a method or process, or computer software on a computer-accessible medium.

DETAILED DESCRIPTION

Particular embodiments of the invention are illustrated herein in conjunction with the drawings.

Various details are set forth herein as they relate to certain embodiments. However, the invention can also be implemented in ways which are different from those described herein. Modifications can be made to the discussed embodiments by those skilled in the art without departing from the invention. Therefore, the invention is not limited to particular embodiments disclosed herein.

In order to link data packets corresponding with execution loads to more than a few data packets corresponding with execution components, finding an optimum solution may be impractical. However, using embodiments of systems described herein, a near optimum solution may be calculated using a practical amount of computing resources.

Figure 1:
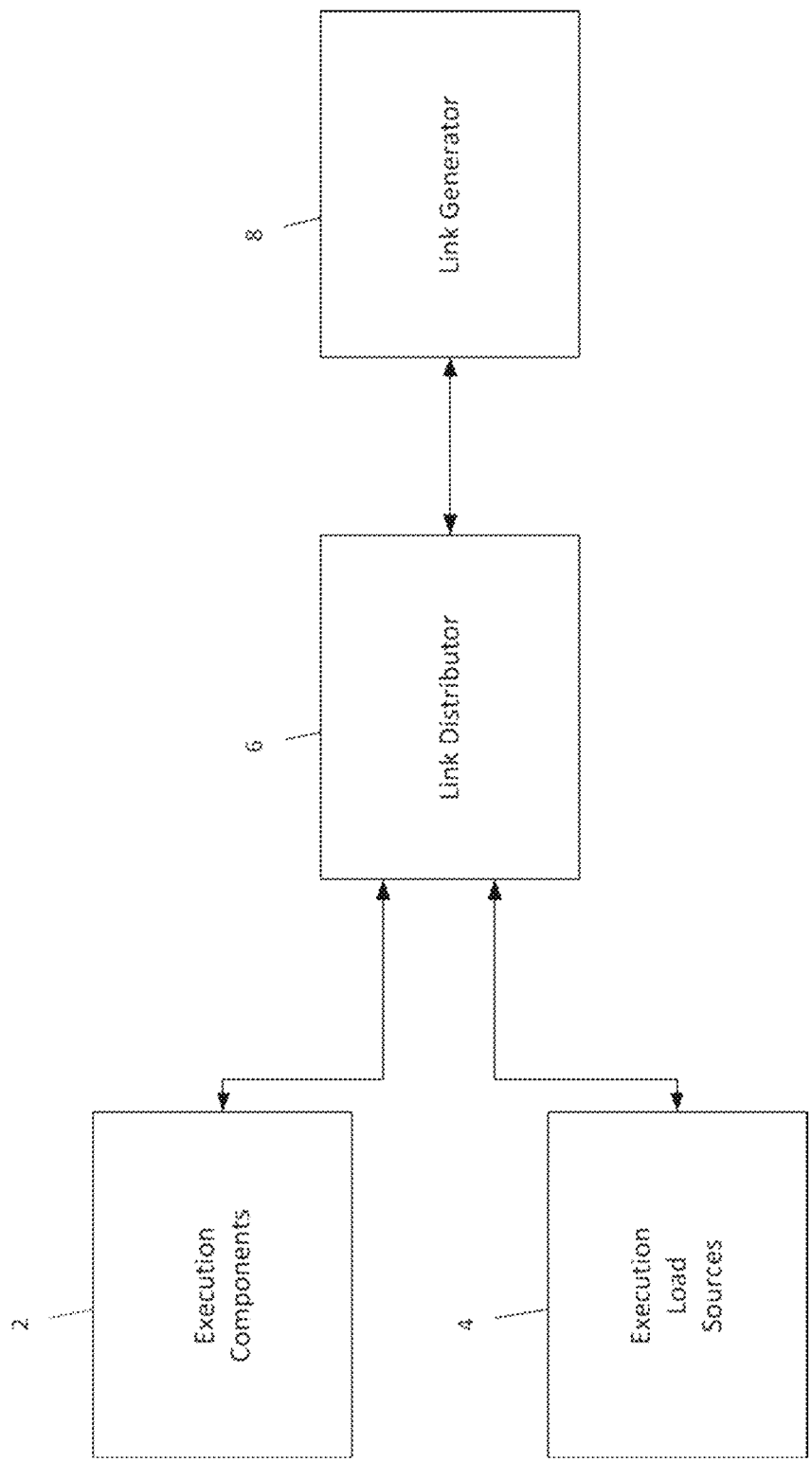
FIG. 1 is a schematic illustration of an exemplary execution load/execution source linking system.

FIG. 1 is a schematic illustration of an exemplary link generation system. The system includes data packets corresponding with execution components 2, which provide data, for example, regarding execution component availability, to a link distribution module 6, for example, via an electronic communications network connecting the two. The system of FIG. 1 also includes sources of execution loads 4, which generate execution loads for the link distribution module 6, for example, via an electronic communications network connecting the two. In some embodiments, the execution load sources 4 may generate instructions for links to be generated between a plurality of data packets corresponding with execution loads and a plurality of data packets corresponding with execution components. Although the data packets corresponding with execution components 2 are represented by a single box in FIG. 1, it should be understood that a plurality of data packets corresponding with execution components are represented by the single box 2. Similarly, the execution load sources 4 are represented by a single box in FIG. 1, but comprise a plurality of execution load sources.

The link distribution module 6 receives the data from the data packets corresponding with execution components 2 and the instructions from execution load sources 4. The data and the instructions may be packaged and delivered from the link distribution module 6 to a link generation module 8, for example, via an electronic communications network connecting the two.

The link generation module 8 receives the data regarding the data packets corresponding with execution components 2 and the instructions for links to be generated between the data packets corresponding with execution loads and the data packets corresponding with execution components and generates the links. Once the links have been generated, the link generation module 8 communicates the links to the link distribution module 6 via the network. The link distribution module 6 communicates the links for each execution component to the corresponding execution components via the network. In some embodiments, the link distribution module 6 also communicates the links for each execution load source to the respective execution load sources via the network.

Figure 2:
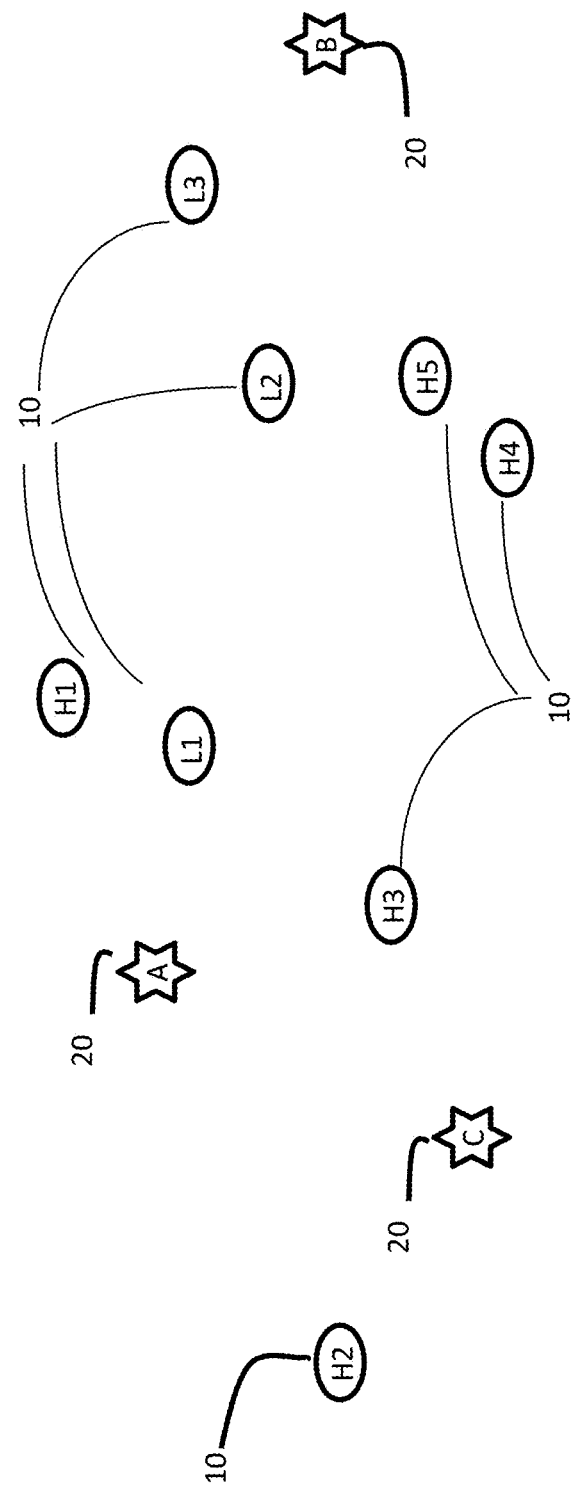
FIG. 2 is a graphical representation of an execution load/execution source link problem for an execution load linking system.

FIG. 2 is a graphical representation of an execution load/execution source link generation problem for a system. While the illustrated specific example may be small enough that an optimum solution may be practical, the example is for discussion purposes, and is used to illustrate various aspects and principles that may be applied to execution load/execution source link calculations that are large enough that an optimum solution is not practical.

The problem presented in FIG. 2 includes multiple execution components 20 and multiple execution loads 10, which, for example, are to be completed according to a deadline associated with the link generation. For example, the execution loads 10 may be due for completion by a deadline. In some embodiments, execution loads may be due for completion by another limit, for example, by a next minute, by a next day, or by a next other limit, for example, less than or greater those discussed. In the example of FIG. 2, each of the execution loads 10 is given a ranking of H (high) or L (low). In addition, each of the execution loads 10 is given an execution load number for identification. Accordingly, it can be seen that there are five high-ranking execution loads labeled H1-H5, and there are also three low-ranking execution loads labeled L1-L3. In addition, there are three execution components 20 labeled A, B, and C. Data packets corresponding with the execution loads are to be linked to data packets corresponding with the execution components 20 so that the execution loads 10 may be completed by the deadline.

Each of the execution components 20 has certain attributes, which may be predetermined. For example, each execution component 20 may be associated with a physical location. Additional execution component attributes may include certifications or capabilities of certain types of execution loads, or an affinity for certain execution load sources or certain types of execution load sources. For example, each execution component may be required for or may be precluded from performing execution loads from certain execution load sources. In some embodiments, execution components attributes may include at least one attribute of a set of attributes including: physical location, capabilities, and availability slots. The execution components 20 may have other attributes.

Each of the execution loads 10 has certain attributes, which may be predetermined. For example, each execution load 10 may be associated with a physical location. In addition, each of the execution loads 10 may have a known availability slot. Additional execution load attributes may include a type of execution load, or that the execution load includes special requirements. Execution load attributes may additionally or alternatively include an affinity indicator or designator for certain execution components. For example, each execution load may have a list of one or more required or precluded execution components. In some embodiments, execution load attributes additionally or alternatively include a start limit, or an end limit. The execution loads 10 may have other attributes as well.

Figure 3:
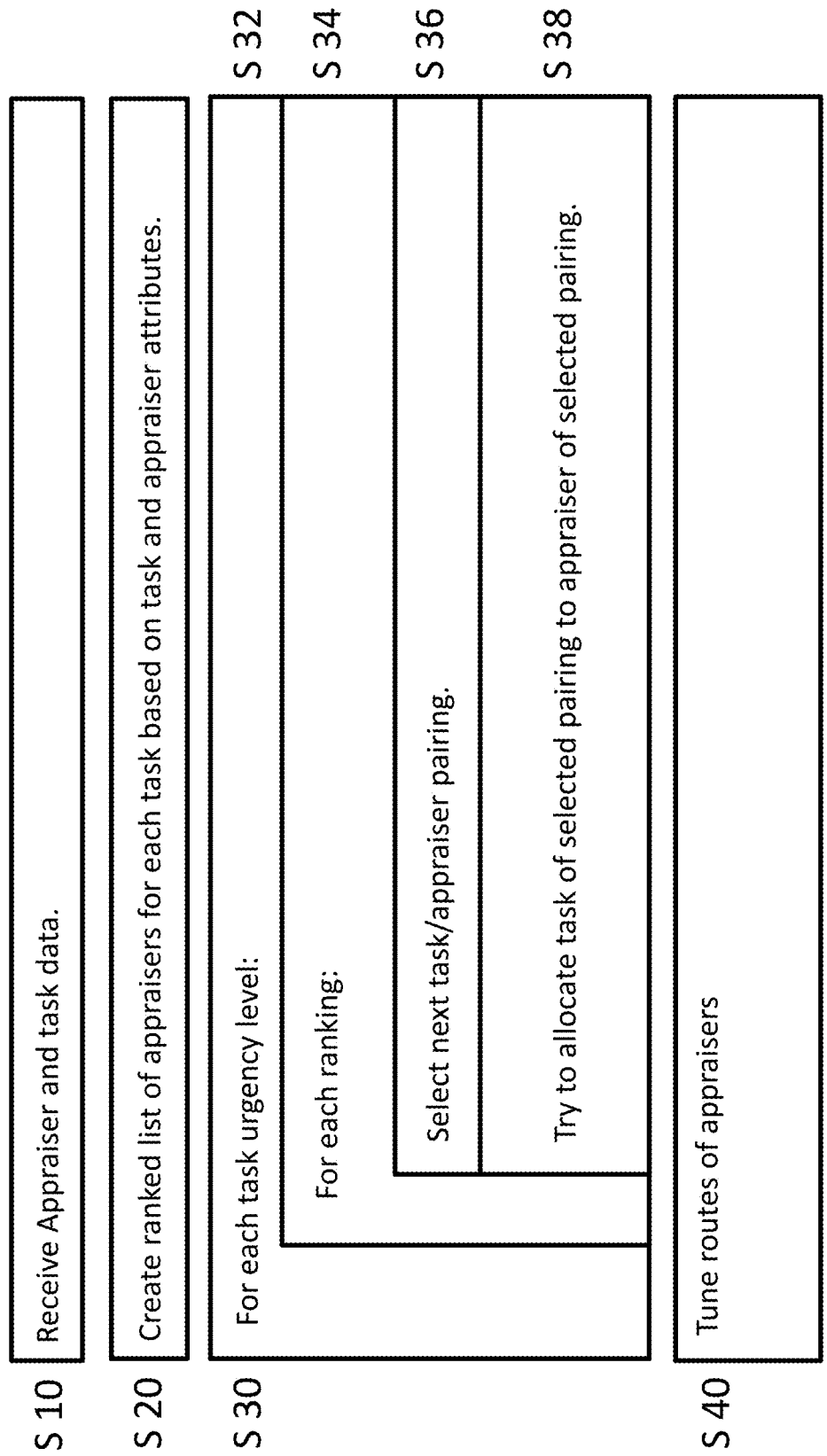
FIG. 3 is a structured flowchart diagram illustrating an embodiment of a method of generating links between sets of data packets corresponding with execution loads and sets of data packets corresponding with execution components.

FIG. 3 is a structured flowchart diagram illustrating a method performed by a computer system to generate links between sets of data packets corresponding with execution loads and sets of data packets corresponding with execution components as described herein.

At S 10 of FIG. 3, the computer system receives data packets corresponding with execution loads and data packets corresponding with execution components. The data packets may include data representing the physical locations associated with each of the execution loads and with each of the execution components. The data packets also include data representing the execution component attributes and the execution load attributes. In some embodiments, the data packets are tested by the computer to ensure validity and usability of the data packets before further proceeding.

In S 20, the computer system generates a list of eligible execution components for each execution load. For example, each data packet corresponding with an execution load may have certain requirements as defined by the corresponding execution load attributes. In addition, based on the execution component attributes, each execution component has certain qualifications. For example, the execution load attributes for a particular data packet corresponding with a particular execution load may include that the particular execution load has specific requirements. Certain data packets corresponding with certain execution components may indicate that the certain execution components are qualified and meet the specific requirements of the particular execution load. At S 20, for each data packet corresponding with an execution load, the computer system generates a list of data packets corresponding with eligible execution components based on the execution load attributes and the execution component attributes. As a result, for the data packet corresponding with the particular execution load, only data packets corresponding with execution components having the required qualifications are included in the list of eligible execution components for that particular execution load.

In addition, at S 20, the computer ranks the data packets corresponding with the eligible execution components for each of the lists. The ranks of the data packets corresponding with eligible execution components provide a metric for each of the data packets corresponding with eligible execution components, whereby the data packets corresponding with eligible execution components may be compared when selecting one of the data packets corresponding with eligible execution components for linking to the data packet corresponding with the execution load of the list. For example, for each data packet corresponding with a particular execution load, each of the data packets corresponding with eligible execution components on the list for the particular execution load receives a ranking indicating a relative appropriateness or desirability or preference of linking the data packet corresponding with the particular execution load to the data packets corresponding with eligible execution components on the list. In some embodiments, the rankings are based on the distance between the physical location associated with each of the data packets corresponding with the execution components on the list and the physical location of the data packet corresponding with the execution load of the list. In such embodiments, rank 1, the top ranking, may be linked to the data packets corresponding with the execution component of the list physically closest to the physical location of the data packet corresponding with the execution load of the list. Additionally or alternatively, the rankings may be based on any other execution component attribute and any other execution load attribute.

At the conclusion of S 20, for each of the data packets corresponding with execution loads, the computer system has generated a ranked list of data packets corresponding with eligible execution components. The rank lists are later used by the computer system to generate links between the data packets corresponding with the execution loads and data packets corresponding with the eligible execution components, as described below.

At S 30, the computer system generates links between the data packets corresponding with the execution loads and the data packets corresponding with the execution components based in part on the ranked lists generated at S 20. To do this, at S 32, the computer system determines a set of data packets corresponding with execution loads having a next highest ranking level. For example, at S 32, the computer system may start the process using data packets corresponding with execution loads having the highest ranking level, and subsequently change the ranking level being used towards lower levels as data packets corresponding with execution loads are linked with data packets corresponding with eligible execution components. For example, the computer may select all of the un-linked data packets corresponding with execution loads having the highest level for inclusion in the set of data packets corresponding with execution loads for possible linkage. As a result, data packets corresponding with execution loads are linked in order of ranking, starting with the highest and proceeding to the lowest. For each set of data packets corresponding with execution loads determined in S 32, the computer performs S 34, S 36, and S 38, as described further below. Once the computer has performed S 34, S 36, and S 38 for each of the sets of data packets corresponding with execution loads determined in S 32, the computer performs S 40 described below.

At S 34, the computer determines a next highest ranking. For example, at S 34, the computer continues the processing using rankings indicating a highest appropriateness of generating a link between a data packet corresponding with a particular execution load and a data packet corresponding with a particular execution component, and changes the ranking towards rankings of less appropriateness once candidate execution load/execution component pairings of higher appropriateness are considered for linkage. For example, the computer system may begin the processing using rank 1. Once the rank 1 candidate execution load/execution component pairings are considered for linkage (discussed below), the computer system again searches the ranked lists of data packets corresponding with execution components for each of the unlinked data packets corresponding with execution loads to determine candidate execution load/execution component pairings indicating a next highest appropriateness of linking.

At the conclusion of S 34, the computer system has compiled a list of candidate execution load/execution component pairings to be considered for linkage. In some embodiments, candidate execution load/execution component pairings may be excluded from the list. For example, if a particular candidate execution load/execution component pairing has been previously considered, a repeat consideration of the particular candidate execution load/execution component pairing may be precluded. This may be accomplished, for example, by maintaining a list of failed linkage attempts for candidate execution load/execution component pairings. As part of S 34, the computer system may reference the list of failed linkage attempts, and exclude any execution load/execution component pairings on the list from the list of candidate execution load/execution component pairings to be considered for linkage. A At S 36, the computer system selects a next candidate execution load/execution component pairing for consideration from the list of candidate execution load/execution component pairings to be considered for linkage. Any selection scheme may be used.

At S 38, the computer determines whether the data packet corresponding with the execution load of the selected candidate execution load/execution component pairing may be linked to the data packet corresponding with the execution component of the selected candidate execution load/execution component pairing. To do this, the computer system may compare the availability of the data packet corresponding with the execution component of the selected candidate execution load/execution component pairing with the expected execution load duration as included in the execution load attributes of the data packet corresponding with the execution load of the selected candidate execution load/execution component pairing, and, for example, with any expected travelling calculated based on at least one of the location of a next previous execution load linked to the execution component of the selected candidate execution load/execution component pairing, the home of the execution component of the selected candidate execution load/execution component pairing, and a current location of the execution component of the selected candidate execution load/execution component pairing. If the availability of the execution component of the selected candidate execution load/execution component pairing does not accommodate the execution load of the selected candidate execution load/execution component pairing, the data packet corresponding with the execution load of the selected candidate execution load/execution component pairing is not linkable to the data packet corresponding with the execution component of the selected candidate execution load/execution component pairing. In response, the computer system returns to S 36, where the computer system selects a next candidate pairing for consideration from the list of candidate execution load/execution component pairings to be considered for linking.

In some embodiments, the computer system determines that the data packet corresponding with the execution load of the selected candidate execution load/execution component pairing may not be linked to the data packet corresponding with the execution component of the selected candidate execution load/execution component pairing based on other factors, not described herein. If, for any reason, the computer system determines that the data packet corresponding with the execution load of the selected candidate execution load/execution component pairing may not be linked to the data packet corresponding with the execution component of the selected candidate execution load/execution component pairing, the computer system may add the selected candidate execution load/execution component pairing to the list of candidate execution load/execution component pairings having failed linakge attempts.

If, however, the availability of the execution component of the selected candidate execution load/execution component pairing does accommodate the execution load of the selected candidate execution load/execution component pairing, the computer system links the data packet corresponding with the execution load of the selected candidate execution load/execution component pairing to the data packet corresponding with the execution component of the selected candidate execution load/execution component pairing. The computer system then modifies the execution load sequence of the execution component of the selected candidate execution load/execution component pairing to include the newly linked execution load. The modification is made according to execution load attributes of the newly linked execution load. After the data packet corresponding with an execution load is linked, the computer returns to S 36 for selection of a next candidate pairing to be considered for linkage.

At the conclusion of S 30, various data packets corresponding with the execution loads have been linked to various data packets corresponding with the execution components. However, the sequence of the execution loads of the linked data packets for execution component has been determined based on the order the data packets corresponding with the execution loads were linked. This sequence might be improved through optimization.

At S 40, the execution load sequence for each of the execution component is optimized. Various optimization routines may be used, which will be known to those skilled in the art. In some embodiments, the locations of the execution loads for an execution component are used as a basis for optimizing the route of the execution component. For example, the execution load located nearest the home or next previous execution load of the execution component may be selected as the next execution load to be completed. In some embodiments, selection of a next execution load to be completed is based at least in part on a geometric analysis of an execution component/execution load representation on a plot or map of the geographic area. For example, for each potential next execution load for an execution component, an angle may be determined, where the determined angle is formed between first and second line segments. The first line segment connects the current execution load and the next previous execution load and the second line segment connects the current execution load and the potential next execution load. Potential next execution loads having angles nearest 180° may be preferred in the selection process. In some embodiments, potential next execution loads having angles nearest 0° may be preferred in the selection process. In some embodiments, potential next execution loads having angles nearest another particular angle may be preferred in the selection process.

Once the execution load sequences for the execution components have been optimized, the sequence of one or more of the execution components may have been optimized such that it could accommodate one or more additional execution loads. Accordingly, in some embodiments, S 10 through S 40 may be repeated to add additional execution loads to the routes and sequences of the execution components.

Numerous applications link data packets corresponding with execution loads with data packets corresponding with execution components, and may benefit from the embodiments discussed herein. For example, in a computer system computing assigning appraisals, links generated between data packets corresponding with execution component or the appraiser and data packets corresponding with execution loads or appraisals are used. See, for example, application Ser. No. 14/070,160, filed Nov. 1, 2013, incorporated herein by reference, which discusses such systems.

Figure 4:
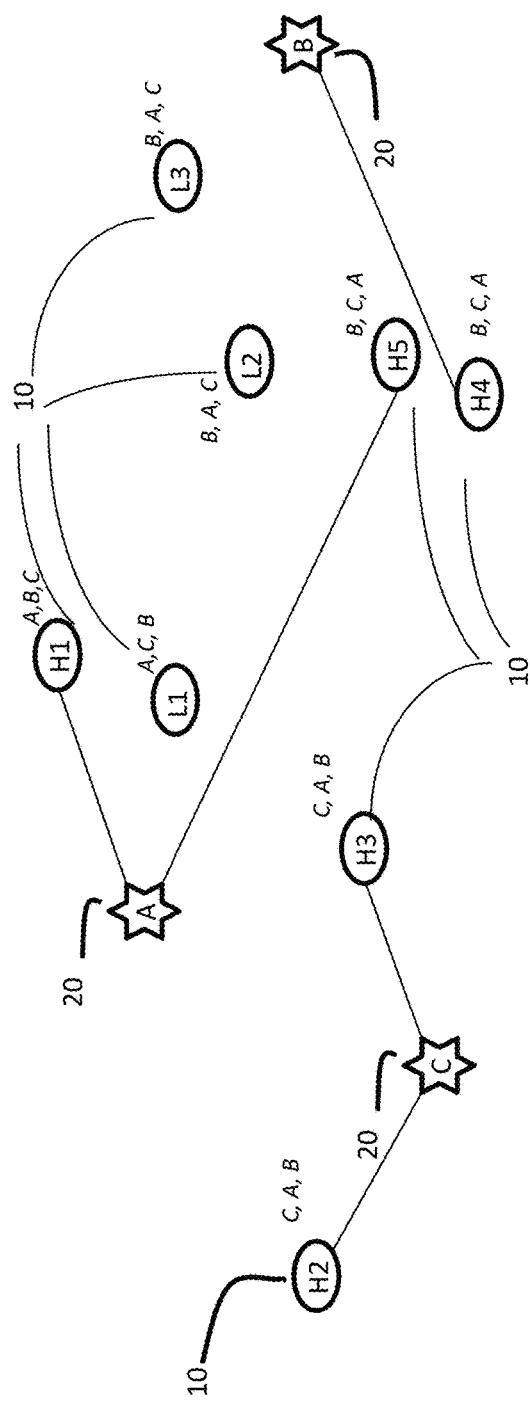
FIG. 4 is a graphical illustration of an execution component/execution load linking problem.

FIG. 4 is a graphical illustration of an execution component/execution load linking problem, and includes a table of steps taken by the computer system in performing the method of FIG. 3 to determine a solution. In the computer system, execution loads may be linked to execution components by linking data packets corresponding with the execution loads to data packets corresponding with the execution components. The problem illustrated in FIG. 4 includes execution components 20 and execution loads 10. Each of the execution loads 10 is given a ranking of H (high) or L (low) and a numerical identifier as in FIG. 2. In addition, for each of the execution loads 10, the computer system has generated a list of eligible execution components 20 in order of ranking.

The table of FIG. 4 illustrates the activity at each occurrence of S 38 as the computer system performs the method represented by the structured flow diagram of FIG. 3. The occurrences of S 38 are performed iteratively, such that each successive occurrence of S 38 is performed after another. In each occurrence of S 38, the computer system computes whether the execution load of the candidate execution load/execution component pairing selected at S 36 may be linked to the execution component of the candidate execution load/execution component pairing selected at S 36, and generates a link between the data packet corresponding with the execution load of the candidate execution load/execution component pairing and the data packet corresponding with the execution component of the candidate execution load/execution component pairing if appropriate. If not appropriate, the computer system considers a next candidate execution load/execution component pairing for linkage.

Prior to occurrence 1 of S 38, the computer system selects ranking 1 at S 34 and selects candidate execution load/execution component pairing H1-A at S 36. In occurrence 1 of S 38, represented by the data in the table for the row marked "Occurrence 1", the computer system determines that data packet corresponding with execution load H1 may be linked to the data packet corresponding with execution component A based on, for example, execution load H1 being less than a maximum distance from the execution component A, such that execution component A may to travel to execution load H1 and complete execution load H1 within a limit. As a result of the determination, the computer system generates the link.

The computer then repeats S 36, selecting the candidate execution load/execution component pairing H2-C. In occurrence 2 of S 38, the computer system determines that a data packet corresponding with execution load H2 may be linked to a data packet corresponding with execution component C, and, as a result of the determination, generates the link. Likewise, the computer repeats S 36, selecting candidate execution load/execution component pairing H3-C. In occurrence 3 of S 38, the computer determines that a data packet corresponding with execution load H3 may be linked to a data packet corresponding with execution component C, and consequently generates the link.

The computer system then repeats S 36, selecting the candidate execution load/execution component pairing H4-B. In occurrence 4 of S 38, the computer system determines that the data packet corresponding with an execution load H4 may be linked to the data packet corresponding with execution component B, and generates the link because of the determination.

The computer then repeats S 36, selecting candidate execution load/execution component pairing H5-B. In occurrence 5 of S 38, the computer determines that the data packet corresponding with an execution load H5 may not be linked to the data packet corresponding with execution component B based on, for example execution load H5 being greater than a maximum distance from the previous execution load (H4) of data execution component B. Accordingly, because of the determination, the computer system does not generate the link.

Because there are no more rank 1 candidate pairings, the computer then repeats S 34 and selects the next highest ranking, 2, for the unlinked execution loads.

The computer then performs S 36, selecting candidate execution load/execution component pairing H5-C. In occurrence 6 of S 38, the computer determines that execution load H5 may not be linked to execution component C based on, for example, execution load H5 being greater than a maximum distance from an expected physical location of execution component C.

The computer then repeats S 36, selecting candidate execution load/execution component pairing H5-A. In occurrence 7 of S 38, the computer determines that the data packet corresponding with execution load H5 may be linked to the data packet corresponding with execution component A. The determination causes the computer system to generate the link.

Figure 5:
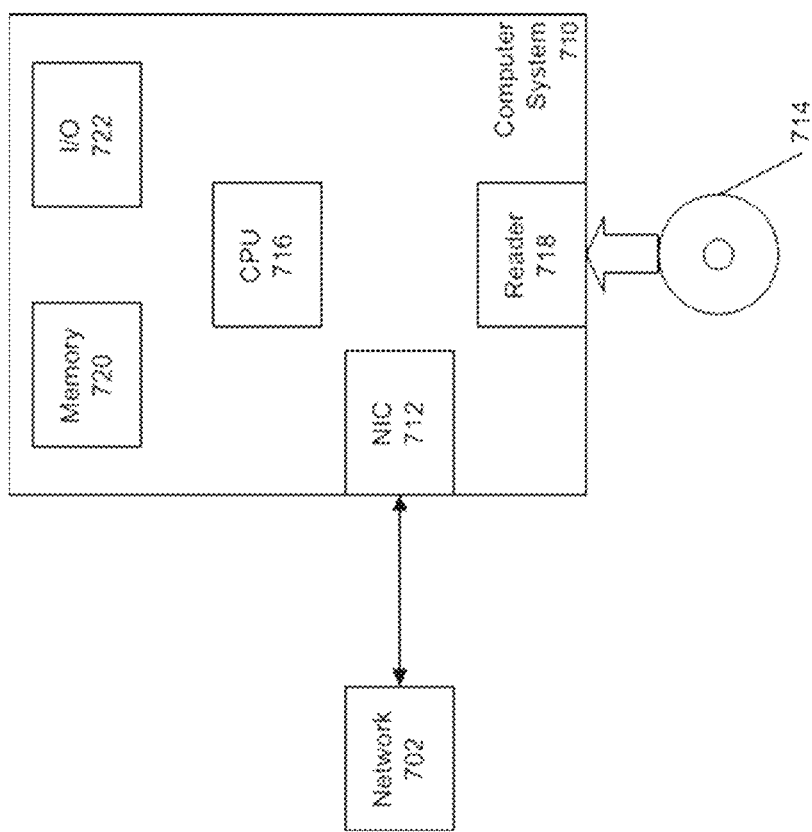
FIG. 5 illustrates a configuration for a computer system constructed in accordance with the present disclosure.

FIG. 5 illustrates a configuration for a computer system 710 constructed in accordance with the present disclosure for performing the steps described herein. The computer system 710 can comprise a system such as a personal computer or other computer or the like. The computer system 710 may include a network communication interface 712 that permits communications with a network 702. The network interface can comprise a network interface card (NIC). The computer system 710 can execute instructions to provide a computer system which performs various aspects and principles of the features described herein for the computer of FIGS. 1-4.

The computer system 710 includes a central processor unit 716 (CPU) and a program product reader 718 for receiving a program product media and reading program instructions recorded thereon, where the instructions, when executed by the CPU of the computer system cause the computer to perform various aspects and principles and features described herein. The computer system also includes associated memory 720 and input/output facilities 722, which may include systems such as a display for output and a keyboard and/or mouse for input. The processor 716 of the computer system 710 can receive program instructions into the program memory of the processor. The program instructions can be received directly, such as by flashing EEPROM of the processor, or can be received through the network interface 712, such as by download from a connected device or over a WAN or LAN network communication. If desired, the program instructions can be stored on a computer program product 714 that is read by the computer system 710 so that the program instructions can thereafter be executed. That is, the program product 714 is for use in a system such as the computer system 710, wherein the program product comprises a tangible, non-transitory recordable media containing a program of computer-readable instructions that are executable by the CPU 716 to perform the steps described herein. The program product 714 can comprise, for example, optical program media such as CD or DVD data discs, or flash memory drives, or external memory stores, or floppy magnetic disks, and the like.

The present invention has been described above in terms of presently preferred embodiments so that an understanding of the present invention can be conveyed. There are, however, many configurations for network devices and management systems not specifically described herein but with which the present invention is applicable. The present invention should therefore not be seen as limited to the particular embodiments described herein, but rather, it should be understood that the present invention has wide applicability with respect to network devices and management systems generally. All modifications, variations, or equivalent arrangements and implementations that are within the scope of the attached claims should therefore be considered within the scope of the invention.

What is claimed is:

1. A method of generating links between a plurality of data packets corresponding with execution loads to a plurality of data packets corresponding with execution components, the method comprising:

generating a plurality of first candidate pairings, each first candidate pairing identifying:
  a first particular data packet corresponding with a first particular one of the execution loads, and
  one of the data packets corresponding with the execution components;
ranking the generated first candidate pairings;
generating a plurality of second candidate pairings, each second candidate pairing identifying:
  a second particular data packet corresponding with a second particular one of the execution loads, and
  one of the data packets corresponding with the execution components,
wherein the first particular execution load is different from the second particular execution load;
ranking the generated second candidate pairings;
selecting the highest ranked first candidate pairing based at least in part on the highest ranked first candidate pairing being highest ranked of the first candidate pairings, wherein the selected first candidate pairing identifies a first data packet corresponding with a first execution load and a second data packet corresponding with a first execution component;
determining whether the first data packet is linkable to the second data packet;
in response to the first data packet being linkable to the second data packet:
  generating a link between the first data packet the second data packet,
  communicating the generated link to the first execution component, and
  selecting the highest ranked second candidate pairing based at least in part on the highest ranked second candidate pairing being highest ranked of the second candidate pairings, and;
in response to the first data packet not being linkable to the second data packet, selecting the highest ranked second candidate pairing based at least in part on the highest ranked second candidate pairing being highest ranked of the second candidate pairings.

2. The method of claim 1, wherein generating each of the pluralities of first and second candidate pairings comprises determining which data packets corresponding with execution components are eligible for linkage to each of the data packets corresponding with the execution loads, and generating candidate pairings which each include one of the data packets corresponding with execution loads and one of the data packets corresponding with execution components which are determined to be eligible.

3. The method of claim 2, wherein determining which data packets corresponding with execution components are eligible for linkage to each of the data packets corresponding with the execution loads comprises performing an analysis of execution load attributes and execution component attributes.

4. The method of claim 1, wherein ranking the first and second candidate pairings indicates a relative desirability of linking the execution load of each particular candidate pairing to the execution component of the particular candidate pairing relative to linking the execution load of each particular candidate pairing to one or more other execution components.

5. The method of claim 4, wherein ranking the first and second candidate pairings indicates a proximity of a physical location of the execution load of each particular candidate pairing to the physical location of the execution component of the particular candidate pairing relative to a proximity of the physical location of the execution load of each particular candidate pairing to a physical location of one or more other execution components.

6. The method of claim 4, further comprising selecting a group of candidate pairings having the same rank, wherein the highest ranked first candidate pairing is selected from the group of highest ranked candidate pairings.

7. The method of claim 1, wherein determining whether the first data packet is linkable to the second data packet comprises determining whether an availability of the execution component of the second data packet accommodates the execution load of the first data packet.

8. The method of claim 7, wherein determining whether the availability of the execution component of the second data packet accommodates the execution load of the first data packet comprises determining an expected execution duration for the execution load of the first data packet and determining a travel parameter for the execution component of the second data packet.

9. A computer system, comprising:
a processor; and
a memory, comprising instructions, which when executed by the process cause the computer system to perform a method of generating links between a plurality of data packets corresponding with execution loads to a plurality of data packets corresponding with execution components, the method comprising:
  generating a plurality of first candidate pairings, each first candidate pairing identifying:
    a first particular data packet corresponding with a first particular one of the execution loads, and
    one of the data packets corresponding with the execution components;
  generating a plurality of second candidate pairings, each second candidate pairing identifying:
    a second particular data packet corresponding with a second particular one of the execution loads, and
    one of the data packets corresponding with the execution components,
  wherein the first particular execution load is different from the second particular execution load;
  ranking the generated second candidate pairings,
  selecting the highest ranked first candidate pairing based at least in part on the highest ranked first candidate pairing having being highest ranked of the first candidate pairing, wherein the selected first candidate pairing identifies a first data packet corresponding with a first execution load and a second data packet corresponding with a first execution component;
  determining whether the first data packet is linkable to the second data packet;
  in response to the first data packet being linkable to the second data packet:
    generating a link between the first data packet the second data packet, and
    selecting the highest ranked second candidate pairing based at least in part on the highest ranked second candidate pairing being highest ranked of the second candidate pairings; and
  in response to the first data packet not being linkable to the second data packet, selecting the highest ranked second candidate pairing based at least in part on the highest ranked second candidate pairing being highest ranked of the second candidate pairings.

10. The system of claim 9, wherein generating each of the pluralities of first and second candidate pairings comprises determining which data packets corresponding with execution components are eligible for linkage to each of the data packets corresponding with the execution loads, and generating candidate pairings which each include one of the data packets corresponding with execution loads and one of the data packets corresponding with execution components which are determined to be eligible.

11. The system of claim 10, wherein determining which data packets corresponding with execution components are eligible for linkage to each of the data packets corresponding with the execution loads comprises performing an analysis of execution load attributes and execution component attributes.

12. The system of claim 9, wherein ranking the first and second candidate pairings indicates a relative desirability of linking the execution load of each particular candidate pairing to the execution component of the particular candidate pairing relative to linking the execution load of each particular candidate pairing to one or more other execution components.

13. The system of claim 12, wherein ranking the first and second candidate pairings indicates a proximity of the physical location of the execution load of each particular candidate pairing to the physical location of the execution component of the particular candidate pairing relative to a proximity of the physical location of the execution load of each particular candidate pairing to the physical location of one or more other execution components.

14. The system of claim 12, wherein the method further comprises selecting a group of candidate pairings having the same rank, wherein the highest ranked first candidate pairing is selected from the group of highest ranked candidate pairings.

15. The system of claim 9, wherein determining whether the first data packet is linkable to the second data packet comprises determining whether an availability of the execution component of the second data packet accommodates the execution load of the first data packet.

16. The system of claim 15, wherein determining whether the availability of the execution component of the second data packet accommodates the execution load of the first data packet comprises determining an expected execution duration for the execution load of the first data packet and determining a travel parameter for the execution component of the second data packet.

17. A computer readable medium comprising non-transient instructions, which, when executed by a computer, cause the computer to perform a method of generating links between a plurality of data packets corresponding with execution loads to a plurality of data packets corresponding with execution components, the method comprising:
 generating a plurality of first candidate pairings, each first candidate pairing identifying:
  a first particular data packet corresponding with a first particular one of the execution loads, and
  one of the data packets corresponding with the execution components;
 generating a plurality of second candidate pairings, each second candidate pairing identifying:
  a second particular data packet corresponding with a second particular one of the execution loads, and
  one of the data packets corresponding with the execution components,
 wherein the first particular execution load is different from the second particular execution load,
 ranking the generated second candidate pairings,
 selecting the highest ranked first candidate pairing based at least in part on the highest ranked first candidate pairing being highest ranked of the first candidate pairings, wherein the selected first candidate pairing identifies a first data packet corresponding with a first execution load and a second data packet corresponding with a first execution component;
 determining whether the first data packet is linkable to the second data packet;
 in response to the first data packet being linkable to the second data packet:
 generating a link between the first data packet the second data packet, and
 selecting the highest ranked second candidate pairing based at least in part on the highest ranked second candidate pairing being highest ranked of the second candidate pairings; and
 in response to the first data packet not being linkable to the second data packet, selecting the highest ranked second candidate pairing based at least in part on the highest ranked second candidate pairing being highest ranked of the second candidate pairings.

18. The computer readable medium of claim 17, wherein generating each of the plurality of first and second candidate pairings comprises determining which data packets corresponding with execution components are eligible for linkage to each of the data packets corresponding with the execution loads, and generating candidate pairings which each include one of the data packets corresponding with execution loads and one of the data packets corresponding with execution components which are determined to be eligible.

19. The computer readable medium of claim 18, wherein determining which data packets corresponding with execution components are eligible for linkage to each of the data packets corresponding with the execution loads comprises performing an analysis of execution load attributes and execution component attributes.

20. The computer readable medium of claim 17, wherein ranking the first and second candidate pairings indicates a relative desirability of linking the execution load of each particular candidate pairing to the execution component of the particular candidate pairing relative to linking the execution load of each particular candidate pairing to one or more other execution components.

21. The computer readable medium of claim 20, wherein ranking the first and second candidate pairings indicates a proximity of the physical location of the execution load of each particular candidate pairing to the physical location of the execution component of the particular candidate pairing relative to a proximity of the physical location of the execution load of each particular candidate pairing to the physical location of one or more other execution components.

22. The computer readable medium of claim 20, wherein the method further comprises selecting a group of candidate pairings having the same rank, wherein the highest ranked first candidate pairing is selected from the group of highest ranked candidate pairings.

23. The computer readable medium of claim 17, wherein determining whether the first data packet is linkable to the second data packet comprises determining whether an availability of the execution component of the second data packet accommodates the execution load of the first data packet.

24. The computer readable medium of claim 23, wherein determining whether the availability of the execution component of the second data packet accommodates the execution load of the first data packet comprises determining an expected execution duration for the execution load of the first data packet and determining a travel parameter for the execution component of the second data packet.

\* \* \* \* \*